(12) United States Patent
Sarokhan

(10) Patent No.: US 11,258,105 B2
(45) Date of Patent: Feb. 22, 2022

(54) SUBSURFACE MARINE BATTERY PACK

(71) Applicant: Ocean Power Technologies, Inc., Monroe Township, NJ (US)

(72) Inventor: Joseph Sarokhan, Basking Ridge, NJ (US)

(73) Assignee: Ocean Power Technologies, Inc.

( * ) Notice: Subject to any disclaimer, the term of this patent is extended or adjusted under 35 U.S.C. 154(b) by 333 days.

(21) Appl. No.: 16/684,922

(22) Filed: Nov. 15, 2019

(65) Prior Publication Data

US 2020/0161715 A1 May 21, 2020

Related U.S. Application Data

(60) Provisional application No. 62/768,424, filed on Nov. 16, 2018.

(51) Int. Cl.
| | |
|---|---|
| *H01M 10/42* | (2006.01) |
| *B63B 35/00* | (2020.01) |
| *H01M 50/20* | (2021.01) |

(52) U.S. Cl.
CPC .......... *H01M 10/425* (2013.01); *B63B 35/00* (2013.01); *H01M 50/20* (2021.01); *B63B 2035/007* (2013.01); *H01M 2010/4271* (2013.01); *H01M 2220/20* (2013.01)

(58) Field of Classification Search
None
See application file for complete search history.

(56) References Cited

U.S. PATENT DOCUMENTS

2018/0222560 A1* 8/2018 Postic ................ B63G 8/001

* cited by examiner

*Primary Examiner* — Wyatt P McConnell
(74) *Attorney, Agent, or Firm* — Jonathan Pierce; Pierre Campanac; Porter Hedges LLP

(57) ABSTRACT

A subsurface battery system includes a ballast mass at the seafloor, a deep-sea electronics module, having an interface to seafloor payloads, and a subsurface buoyant pressure vessel having a battery. The ballast mass is attached to the deep-sea electronics module. The deep-sea electronics module is connected to the battery. The subsurface buoyant pressure vessel is submerged to a water depth of approximately 50 meters to 500 meters. The system is used for powering the seafloor payloads.

13 Claims, 1 Drawing Sheet

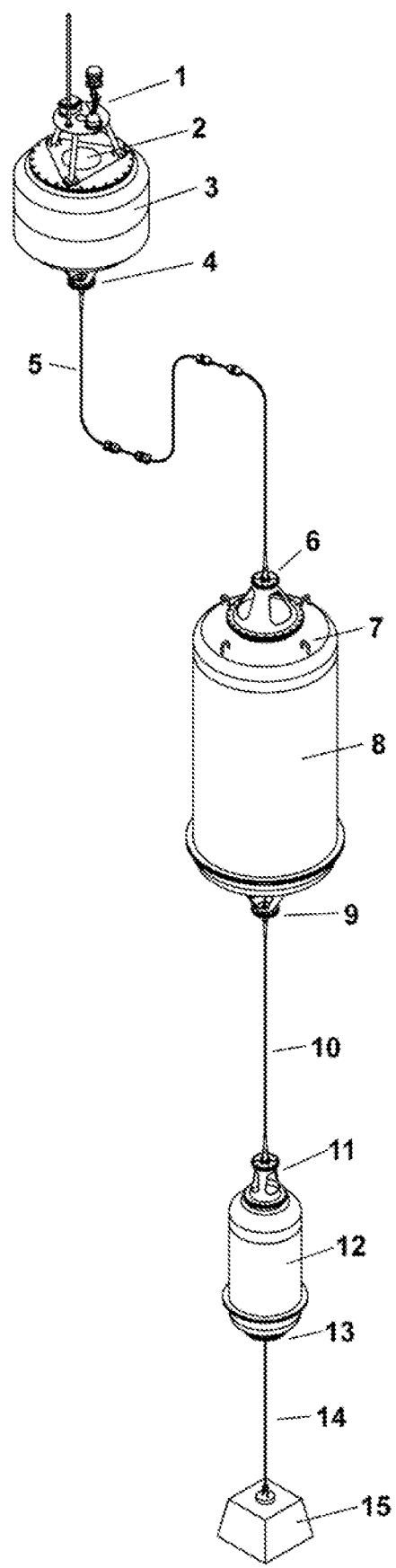

SUBSURFACE MARINE BATTERY PACK

CROSS-REFERENCE TO RELATED APPLICATIONS

This application claims priority to U.S. provisional application Ser. No. 62/768,424 filed on Nov. 16, 2018, the content of which is included herein by reference.

BACKGROUND

The disclosure relates to the design and use of a buoyant, subsurface battery pack for use in subsea marine applications.

Battery packs are used to provide power to a wide range of marine applications. Battery packs are reliable, efficient, and can operate for long periods of time before requiring maintenance or recharging, especially in challenging environments where it may be difficult or prohibited to operate generation equipment such as diesel engines.

There are three main designs of marine battery packs intended for deployment at sea. The first type is a floating battery, often installed on a barge and tethered to the seafloor using an anchor and chain. This type of battery can be low cost and easy to tow out and deploy but may not be suitable for use in very deep water or areas with high storm potential that could capsize the battery barge or subject the mooring to very high loads.

The second type of battery is installed on the seafloor inside a heavy pressure vessel. This battery has the advantage of being immune to surface storms, but can be very expensive, especially in deep water where the pressure vessel may cost and weigh several times more than the battery which it contains. Transport and deployment of this battery can also be very expensive due to the excessive weight of the pressure vessel, the size of the cranes needed to lift it and lower it to the seafloor, and the possible requirement to have underwater remote operated vehicles (ROVs) to assist with guiding the battery back to the seafloor and selecting an installation site of acceptable flatness and composition. These extremely heavy pressure vessel batteries run the risk of becoming stuck in the mud or buried in sand at some locations and can be difficult and expensive to recover.

The third type of subsea battery pack is a pressure compensated design, where the cells and support electronics are designed to tolerate high pressures and are surrounded in a bath of nonconductive oil or polymer. The water pressure load is directly transferred through a slightly flexible outer vessel to the non-compressible oil and battery pack inside, equalizing the pressure. This design tends to be lighter weight and easier to transport and deploy, but is very complicated and expensive to build, and may be subject to failure if all the components are not specifically designed to handle the extreme pressures without cracking or degradation.

Therefore, there is a continuing need in the art for a marine battery pack which is tolerant of surface storms, easy to transport and deploy, resistant to becoming stuck in seafloor mud or buried in sand, and capable of installation in very deep water. Preferably, the battery system is also reliable, cost-effective, light weight, and easily recoverable.

SUMMARY

The disclosure describes a subsurface battery system for powering seafloor payloads in marine environments.

The subsurface battery system may comprise a subsurface buoyant pressure vessel. The subsurface buoyant pressure vessel may have a compartment. The compartment may include a battery.

The subsurface battery system may comprise a deep-sea electronics module. The deep-sea electronics module may include an interface to the seafloor payloads. The deep-sea electronics module may be connected to the battery by a tension leg mooring tether. The tension leg mooring tether may be of nearly neutral buoyancy in seawater.

The subsurface battery system may comprise a ballast mass. The ballast mass may be attached to the deep-sea electronics module by a mooring cable. The mooring cable may be of nearly neutral buoyancy in seawater.

The subsurface battery system may comprise a surface buoy. The surface buoy may include an equipment platform having communications equipment or sensors. The surface buoy may be coupled to the subsurface buoyant pressure vessel by a surface umbilical tether. The surface umbilical tether may include floats and weights.

The subsurface battery system may comprise a remote release module operable for disconnecting the mooring cable from the deep-sea electronics module. The remote release module may be triggered through a secure communications interface connected to the surface buoy via the surface umbilical tether and the tension leg mooring tether.

The disclosure describes a method of using a subsurface battery system for powering seafloor payloads in marine environments.

The method may comprise the step of providing a ballast mass at seafloor. The ballast mass may be attached to a deep-sea electronics module by a mooring cable. The mooring cable may be of nearly neutral buoyancy in seawater.

The method may comprise the step of mooring the deep-sea electronics module to a subsurface buoyant pressure vessel. The deep-sea electronics module may be moored to the subsurface buoyant pressure vessel with a tension leg mooring tether. The tension leg mooring tether may be of nearly neutral buoyancy in seawater.

The method may comprise the step of connecting a battery to an interface to the seafloor payloads. The interface to the seafloor payloads may be included in the deep-sea electronics module. The battery may be included in a compartment of the subsurface buoyant pressure vessel.

The method may comprise the step of submerging the subsurface buoyant pressure vessel to a water depth of approximately 50 meters to 500 meters.

The method may comprise the step of powering the seafloor payloads with the battery via an interface to the seafloor payloads, which may be included in the deep-sea electronics module.

The method may comprise the step of coupling a surface buoy to the subsurface buoyant pressure vessel. The surface buoy may be coupled to the subsurface buoyant pressure vessel by a surface umbilical tether. The surface umbilical tether includes floats and weights.

The method may comprise the step of disconnecting the mooring cable from the deep-sea electronics module. The mooring cable may be disconnected from the deep-sea electronics module by triggering a remote release module. The remote release module may be triggered through a secure communications interface. The secure communications interface may be connected to the surface buoy via the surface umbilical tether and via the tension leg mooring tether.

BRIEF DESCRIPTION OF THE DRAWINGS

For a more detailed description of the embodiments of the disclosure, reference will now be made to the accompanying drawings, wherein:

FIG. 1 is a system level drawing showing the surface buoy, surface umbilical tether, buoyant subsurface pressure vessel having a battery compartment, tension leg mooring tether, deep-sea electronics module, and anchor system including ballast mass and mooring cable.

DETAILED DESCRIPTION

It is to be understood that the following disclosure describes exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Additionally, the exemplary embodiments presented below may be combined in any combination of ways, i.e., any element from one exemplary embodiment may be used in any other exemplary embodiment, without departing from the scope of the disclosure.

All numerical values in this disclosure may be approximate values unless otherwise specifically stated. Accordingly, various embodiments of the disclosure may deviate from the numbers, values, and ranges disclosed herein without departing from the intended scope. Moreover, the formation of a first feature over or on a second feature in the description that follows may include embodiments in which the first and second features are formed in direct contact and may also include embodiments in which additional features may be formed interposing the first and second features, such that the first and second features may not be in direct contact.

The disclosure describes a subsurface battery system for the storage of electric energy in batteries, which can be used in autonomous marine applications. The system can be deployed in remote areas of the ocean where there is no access to the electric power grid.

In some embodiments, the subsurface battery system may be used with a small surface buoy that includes an equipment platform, which can be provided with a variety of communications equipment and sensors. The surface buoy may in some embodiments also be capable of power generation and charging of the battery pack to which it is tethered, while in other embodiments it may only include a connection for a remote external charger, or possibly no charging provision at all.

The subsurface battery system described herein can provide average electric power on the order of 10 Watts to 10,000 Watts for a duration ranging from a few weeks to over two years after deployment, and peak loads of many kilowatts can also be supported for short durations. For example, the subsurface battery system can be used to power telephone (e.g., 4G) and/or satellite communication transponders, camera systems, security sensors, seafloor sensors, valve trees, wellhead monitoring equipment, and recharging of autonomous underwater vehicles (AUVs).

Compared to surface barge batteries, the subsurface battery system described herein can be more tolerant of storms and deep-water installations, while remaining easier and lower cost to transport, deploy, and recover than seafloor mounted units in pressure vessels or pressure-compensated designs.

In other embodiments, the subsurface battery can be used with a larger surface buoy, such as the PB3 PowerBuoy, or a large boat hull style hybrid buoy.

The subsurface battery may also be used with no surface float present. This would be advantageous for applications where the subsurface battery system should remain hidden, such as subsea hydrophone arrays or marine surveillance, or for applications where there is heavy shipping traffic and risk of collision.

Referring to FIG. 1, an example embodiment of a subsurface battery system is illustrated. The design includes an equipment platform 1, which may include surface sensors and an optional power generation system 2 used for charging battery, a small surface buoy 3, a surface tether attachment 4, a surface umbilical tether 5 providing data, power, and mooring cables, a surface tether interface 6, lifting and transport provisions 7, a subsurface buoyant pressure vessel 8, which has a compartment including a battery, a tension leg tether interface 9, a tension leg mooring tether 10 providing data, power, and mooring cables, a deep-sea tether interface 11, a deep-sea electronics module 12, a remote release module 13, a mooring cable 14, and a ballast mass 15.

The system functions by floating vertically in the ocean such that the small surface buoy 3 is located at the sea surface, the subsurface buoyant pressure vessel 8, which has a compartment including the battery, is entirely submerged to a depth of approximately 50 meters to 500 meters, the deep-sea electronics module 12 is located either near the seafloor or at a considerable depth, the ballast mass 15 is located on the seafloor and may be buried in several meters of sand or mud, the mooring cable 14 is typically 5 to 20 meters in length in order to prevent the deep-sea electronics module 12 from sinking into the mud as the ballast mass 15 settles over time. An AUV docking station may be integrated into the deep-sea electronics module 12, along with ROV mate-able connectors and other interfaces to deep water electrical payloads.

Although the subsurface buoyant pressure vessel 8 is still designed to withstand pressure, it does not need to handle the pressures associated with ocean depths of thousands of meters, and the resulting vessel is much lighter and lower cost than a battery pressure vessel intended for seafloor deployment. The tension leg mooring tether 10 and the deep-sea electronics module 12 provide the same power interfaces to seafloor payloads as a subsea battery pack, even when the battery pack may be floating several thousand meters above the seafloor.

The system is deployed by lowering the ballast mass 15 off the side of the deployment ship and allowing it to pull on the mooring cable 14 and deep-sea electronics module 12 off the ship and into the water. The tension leg mooring tether 10 is then fed over the side of the ship at a controlled rate until it starts to pull on subsurface buoyant pressure vessel 8, which is then allowed to either roll off a deployment ramp or lowered into the water using a crane. Although the subsurface buoyant pressure vessel 8 is slightly positively buoyant, it will be pulled underwater since the ballast mass 15 has significantly more submerged net weight than the buoyancy provided by the battery compartment. The deep-sea electronics module 12 and the tension leg mooring tether 10 are of nearly neutral buoyancy in seawater. As the subsurface buoyant pressure vessel 8 submerges, the rate of descent of ballast mass 15 will slow, allowing the mooring cable 14, the deep-sea electronics module 12, and the tension leg mooring tether 10 to straighten out and orient vertically in the water column. The surface umbilical tether 5 is a lightweight and flexible but strong connection to the surface that is pulled over the side of the deployment vessel as the remainder of the system continues to descend to the seafloor. The ballast mass 15 will reach the seafloor and may partially embed in sand or mud without affecting the remainder of the system. Once the ballast mass 15 has seated, the small surface buoy 3 can be lowered off the side of the ship, and the deployment process is complete.

The length of the tension leg mooring tether 10 and mooring cable 14 have been pre-configured for the intended deployment site and have a combined length of 50-500 meters less than the water depth. The surface umbilical tether 5 is longer than the distance from the surface tether interface 6 to the sea surface and includes floats and weights such that the tether can handle expected wave heights and tidal variations without putting excess load on the mooring tether or causing small surface buoy 3 to submerge in heavy seas or high tides.

The subsurface buoyant pressure vessel 8 will maintain a constant tension on the tension leg mooring tether 10 due to its slight buoyancy. Since the battery compartment is located at a considerable water depth, it will not be subject to the high mooring loads and accelerations that a floating battery on the surface would need to be designed to handle. The subsurface buoyant pressure vessel 8 does experience some loading from deep water ocean currents, but these forces are orders of magnitude less than those experienced at the surface and are much easier to predict than surface storm loadings. These smaller loads, accelerations, or forces allow reducing the size and cost of the tension leg mooring tether 10 significantly and allow a simple and low-cost ballast mass 15 to be used to moor the entire system rather than a much larger anchor that would be required to handle the surface loads of a large battery pack. Although the small surface buoy 3 does experience storm loading and the surface umbilical tether 5 is designed to handle these loads, the small surface buoy 3 is also an order of magnitude smaller and lighter than buoyant pressure vessel 8, and the resulting loads are much smaller than having the entire battery mass installed at the sea surface.

Conventional seafloor-mounted batteries, whether they are installed in pressure vessels or are pressure tolerant designs, all run the risk of becoming stuck in the mud or buried in sand after extended deployment durations. Since some of these batteries can be installed thousands of meters below the sea surface, it is not possible to use divers to assist with dislodging the battery packs for recovery. It may take a combination of deep water ROVs and large heavy lifting cranes to attach lifting cables to the battery pack, assuming it is not completely buried. This process can be very expensive, and there is a risk that the battery pack may be too deeply buried or stuck to be economical to recover. In contrast, the embodiment described in FIG. 1 may feature an automatic recovery option that is not affected by seafloor conditions and does not require expensive high capacity cranes or ROVs. When the battery system has completed its intended mission and is ready for recovery and relocation, the remote release module 13 is triggered through a secure communications interface, via a wired connection to the surface, by an ROV, or by wireless (e.g., acoustic) connection. This triggering causes the mooring cable 14 and ballast mass 15 to detach from the base of deep-sea electronics module 12, and the entire battery system will regain slight positive buoyancy and will start automatically ascending to the surface. The mooring cable 14 and ballast mass 15 are not recovered and are considered low-cost consumable items. They may be made from non-toxic steel and concrete materials and will decay over time without damage to the seafloor environment. The buoyant pressure vessel 8 will eventually reach the sea surface, where a surface recovery vessel can send a small inflatable boat and crew to attach lifting and transport provisions 7, allowing the system to be lifted out of the water without the need for ROVs or divers. Once the battery compartment is onboard, the tension leg mooring tether 10 can be reeled in along with deep-sea electronics module 12. The mooring cable 14 and ballast mass 15 may be replaced prior to the next deployment of the battery system.

In embodiments where a large floating generation source is to be attached, the design of the subsurface battery module may not change significantly, but an alternate method of connecting the generation source to the subsurface battery, such as having a separate mooring and power umbilical that connect to a different point (such as the base) of the battery system may be used. This alternate method of connecting may reduce mooring loads and tether sizes required for the subsurface battery, but would require a full set of mooring lines and power umbilicals. However, since most mooring designs for the larger buoys also include subsurface floats, it still may be more cost effective to use the floating battery as the mooring even for large surface buoys. Also, using the floating battery as the mooring may reduce the risk of entanglement.

While the disclosure is susceptible to various modifications and alternative forms, specific embodiments thereof are shown by way of example in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. A subsurface battery system for powering seafloor payloads in marine environments, comprising:
   a subsurface buoyant pressure vessel having a compartment including a battery;
   a deep-sea electronics module, the deep-sea electronics module including an interface to the seafloor payloads, the deep-sea electronics module being connected to the battery by a tension leg mooring tether; and
   a ballast mass attached to the deep-sea electronics module by a mooring cable.

2. The subsurface battery system of claim 1 further comprising a surface buoy coupled to the subsurface buoyant pressure vessel by a surface umbilical tether.

3. The subsurface battery system of claim 2 wherein the surface buoy includes an equipment platform having communications equipment or sensors.

4. The subsurface battery system of claim 2 wherein the surface umbilical tether includes floats and weights.

5. The subsurface battery system of claim 1 further comprising a remote release module for disconnecting the mooring cable from the deep-sea electronics module.

6. The subsurface battery system of claim 5 further comprising a surface buoy coupled to the subsurface buoyant pressure vessel by a surface umbilical tether, wherein the remote release module is triggered through a secure communications interface connected to the surface buoy via the surface umbilical tether and the tension leg mooring tether.

7. The subsurface battery system of claim 1 wherein the tension leg mooring tether is of nearly neutral buoyancy in seawater.

8. A method comprising:
   providing a ballast mass attached to a deep-sea electronics module by a mooring cable at seafloor;

mooring the deep-sea electronics module to a subsurface buoyant pressure vessel with a tension leg mooring tether;

connecting a battery to an interface to seafloor payloads, the interface to seafloor payloads being included in the deep-sea electronics module, the battery being included in a compartment of the subsurface buoyant pressure vessel;

submerging the subsurface buoyant pressure vessel to a water depth of approximately 50 meters to 500 meters; and powering the seafloor payloads with the battery.

9. The method of claim 8 further comprising coupling a surface buoy to the subsurface buoyant pressure vessel by a surface umbilical tether.

10. The method of claim 9 wherein the surface umbilical tether includes floats and weights.

11. The method of claim 8 further disconnecting the mooring cable from the deep-sea electronics module by triggering a remote release module.

12. The method of claim 11 wherein the remote release module is triggered through a secure communications interface connected to a surface buoy via a surface umbilical tether that couples the surface buoy to the subsurface buoyant pressure vessel and via the tension leg mooring tether.

13. The method of claim 8 wherein the tension leg mooring tether is of nearly neutral buoyancy in seawater.

* * * * *